United States Patent

Ganz et al.

[11] Patent Number: 4,691,561
[45] Date of Patent: Sep. 8, 1987

[54] INFLOW CONTROL DEVICE FOR ENGINE TESTING

[75] Inventors: Ulrich W. Ganz, Kirkland; Paul C. Topness, Renton, both of Wash.

[73] Assignee: The Boeing Company, Seattle, Wash.

[21] Appl. No.: 873,818

[22] Filed: Jun. 13, 1986

[51] Int. Cl.$^4$ ............................................. G01M 15/00
[52] U.S. Cl. .................................... 73/117.1; 181/213; 181/222
[58] Field of Search .................... 73/117.1, 865.6, 116; 181/214, 217, 218, 222

[56] References Cited

U.S. PATENT DOCUMENTS

| | | | |
|---|---|---|---|
| 3,511,337 | 5/1970 | Pease et al. | 181/52 |
| 3,604,663 | 9/1971 | Custer | 244/53 B |
| 3,698,509 | 10/1972 | Fitting et al. | 181/33 HA |
| 3,714,824 | 2/1973 | Bush | 73/117.4 |
| 3,759,091 | 9/1973 | Reimer | 73/116 |
| 4,168,763 | 9/1979 | White et al. | 181/218 |
| 4,258,823 | 3/1981 | Ganz et al. | 181/214 |
| 4,300,656 | 11/1981 | Burcham | 181/214 |
| 4,421,201 | 12/1983 | Nelsen et al. | 181/214 |

Primary Examiner—Jerry W. Myracle
Attorney, Agent, or Firm—Bruce A. Kaser

[57] ABSTRACT

An air inflow control device (10) simulates flight-like air inflow conditions into the intake (36) of a turbofan engine (18) during static ground tests. The device (10) has a truncated spherical portion (12) with a circular opening that is closed by a bellmouth (14). The bellmouth (14) provides an inwardly projecting conical surface having a central high-lite and throat portion (28, 35) that permits air to flow from inside the sphere (12) into the engine (18).

10 Claims, 6 Drawing Figures

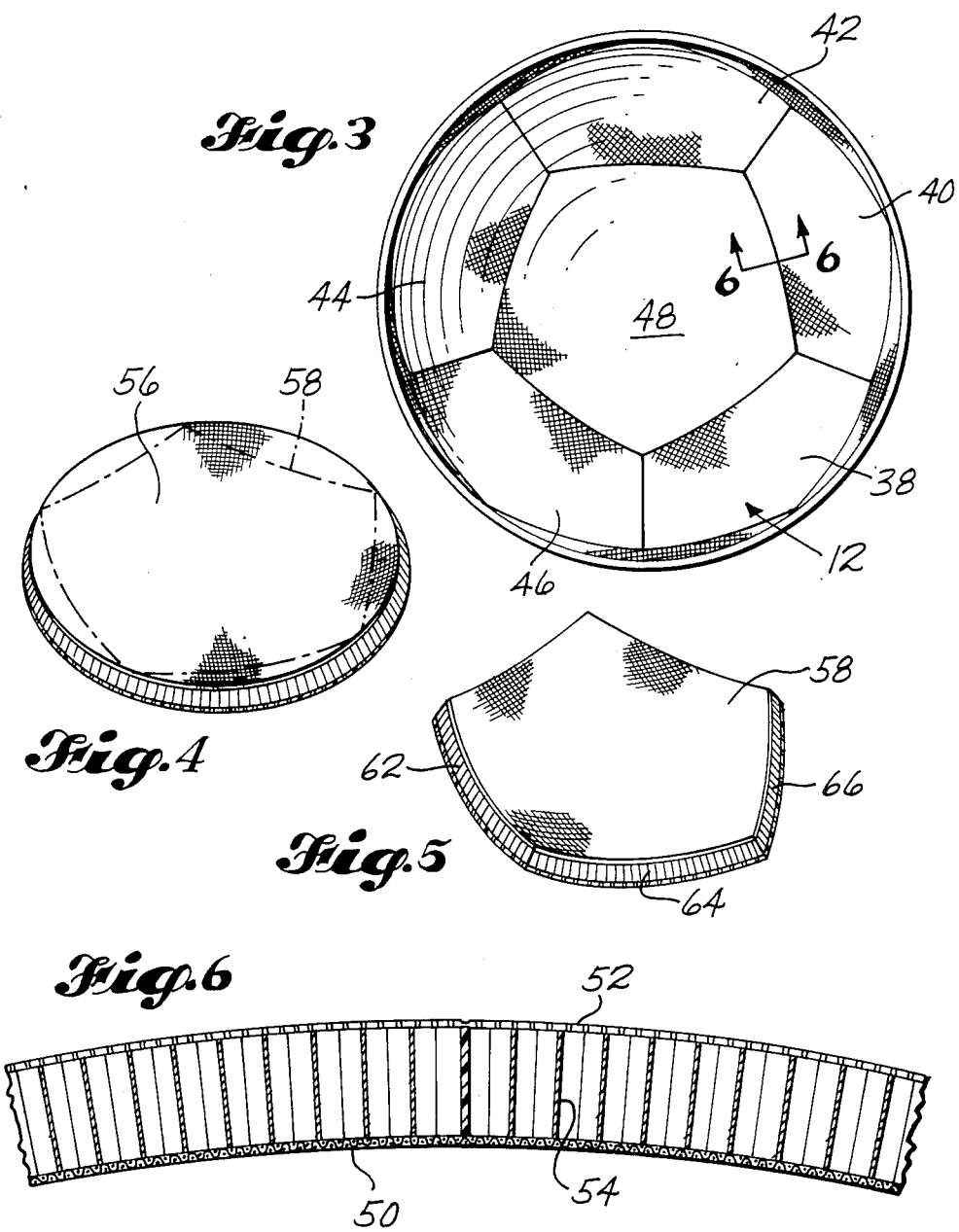

INFLOW CONTROL DEVICE FOR ENGINE TESTING

DESCRIPTION

1. Technical Field

This invention relates to devices used in conjunction with static noise testing of turbofan aircraft engines. More particularly, this invention relates to devices which attenuate inflow distortions and turbulence in air as it enters the intake of a turbofan engine.

2. Background Art

Inflow control devices (ICDs) are used to simulate flight-like air inflow conditions into the intake of a turbofan engine when the engine is subject to static ground tests. It is desirable, for example, to simulate flight-like inflow conditions during ground test study of an engine's noise characteristics. A thorough discussion pertaining to the need for having ICDs and the manner by which ICDs affect intake airflow can be found in U.S. Pat. No. 4,258,823 issued on Mar. 31, 1981.

Several types of ICDs have been built by various companies in the aircraft industry. Typically, these ICDs utilize inflow control surfaces that have the shape of partial spheres whose sidewalls are composed of a variety of materials including aluminum honeycomb, metal screens, and perforated plates. Most of these ICDs have been generally unsuccessful in reducing distortions at the edge of the engine inlet boundary layer. Such distortions may cause, for example, undesirable fan tone noise during engine ground tests which would not be present during actual in-flight use of the engine, thus causing inaccuracies in the study of engine noise characteristics. In addition, previous ICDs often have internal solid structural elements and corners that partially reflect or scatter the sound pressure field propagating through the ICD. This leads to distortion problems in the sound pressure field propagating forward from the engine through the ICD. Sound reflections off the ICD baffle surfaces near the engine inlet have also been known to cause acoustic problems.

It is an object of this invention to provide an inflow control device that reduces inflow turbulence or distortion in the airflow as it enters the intake inlet of a turbofan engine during static ground tests. This invention minimizes the above-stated distortion problems and provides an ICD that represents an improvement over and above those already existing in the art.

3. Disclosure of the Invention

The present invention provides an air inflow control device (ICD) that attenuates flow distorations and turbulence in the intake of a turbofan aircraft engine, or model of an engine, which is set up for static ground tests.

An ICD constructed in accordance with the invention is generally made of a hollow sphere that is truncated at one end so as to define a circular opening into the sphere. The walls of the sphere are pervious to air and may, for example, be made of an inwardly facing layer of wire screen material, an outwardly facing layer of perforated sheet metal, and a layer of honeycomb material sandwiched intermediate of the inwardly and outwardly facing layers.

A circular bellmouth closes the opening into the sphere. This is accomplished by a circular ring member which connects the bellmouth's outer radial edge to the edge of the opening. The bellmouth has a circular recessed portion in which a lining of sound-absorbing material is received. The sound-absorbing material is covered by a sheet of perforated material. This perforated material forms a conical surface projecting inwardly into the sphere.

Centrally located in the bellmouth is a high-lite and throat section which provides a solid surface for the flow, as it turns from a radial direction in the sphere to the axial direction in the inlet of the turbofan engine. The high-lite and throat portion forms a continuous and smooth connection between the conical surface and the intake surface.

In preferred form, the sphere is a polyhedral structure made of a plurality of curved polygonal sections. The sections are adhesively bonded to each other in a manner so that the sphere's sidewall has a substantially smooth and continuous construction.

BRIEF DESCRIPTION OF THE DRAWING

In the drawings, like reference numerals and letters refer to like parts throughout the various views, and wherein:

FIG. 3 is a frontal view of the sphere portion shown in FIGS. 1 and 2, and generally shows the polyhedral construction thereof;

FIG. 4 is a pictorial view of a curved disk, with chamfering lines being shown marked on the disk, for making the disk into a polygonal section to be used to construct the ICD sphere portion shown in FIGS. 1, 2 and 3;

FIG. 5 is a pictorial view of the chamfered disk shown in FIG. 4; and

FIG. 6 is a cross-sectional view of the sidewall of the ICD sphere portion shown in FIGS. 1, 2 and 3, and is taken along along line 6—6 in FIG. 3.

BEST MODE FOR CARRYING OUT THE INVENTION

Figure 1:
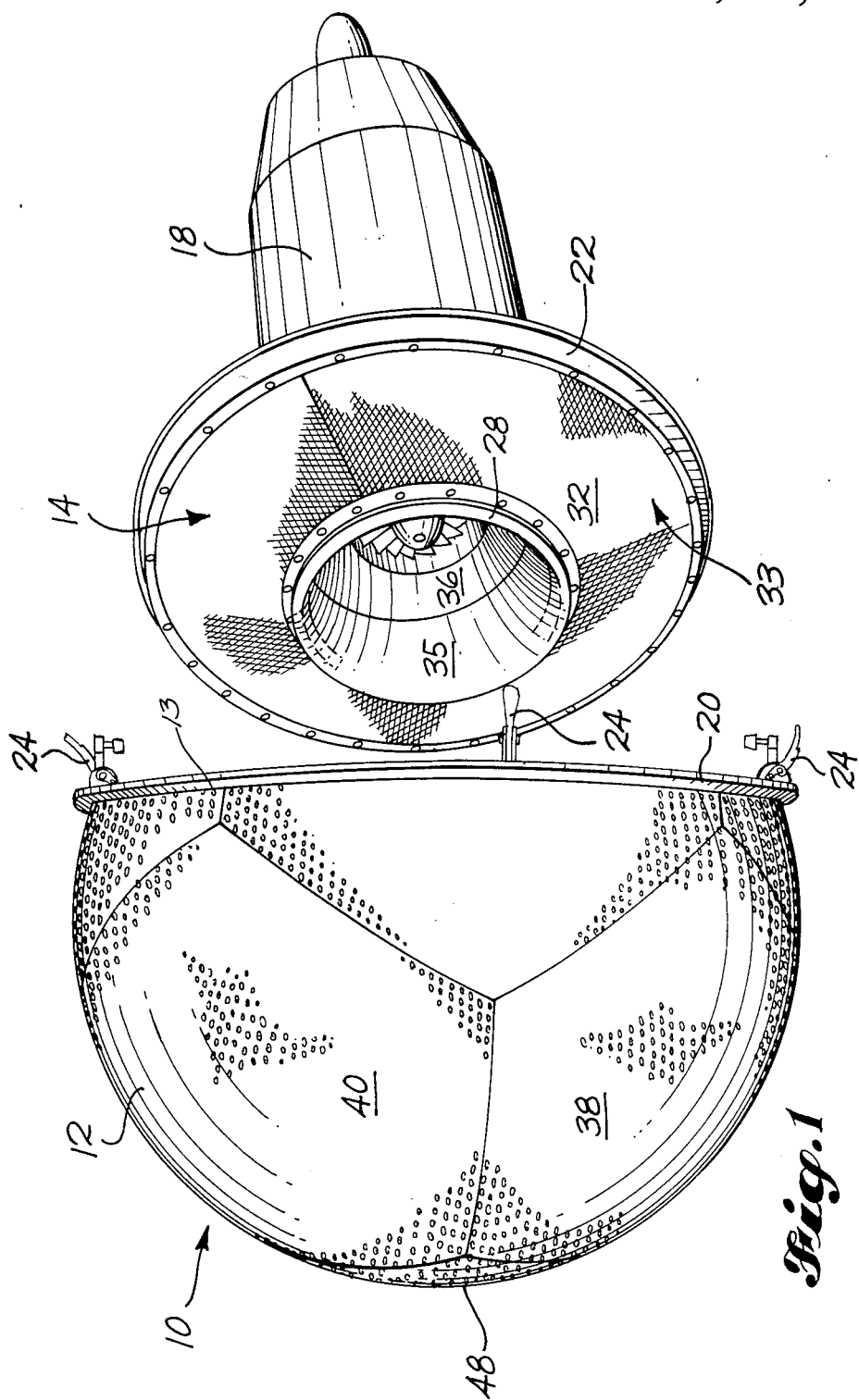
FIG. 1 is a pictorial view of an ICD constructed in accordance with a preferred embodiment of the invention, and shows a hollow sphere portion of the ICD about to be connected to a bellmouth portion of the ICD.

Referring now to the drawings, and first to FIG. 1, therein is shown at 10 an inflow control device (ICD) constructed in accordance with a preferred embodiment of the invention. The ICD 10 includes a generally spherical portion or sphere 12 that is truncated on one side. Truncation provides a circular opening 13 into the sphere 12. A bellmouth portion or bellmouth 14 of the ICD 10 is shown mounted to an engine inlet 36 for static testing of an engine 18.

Figure 2:
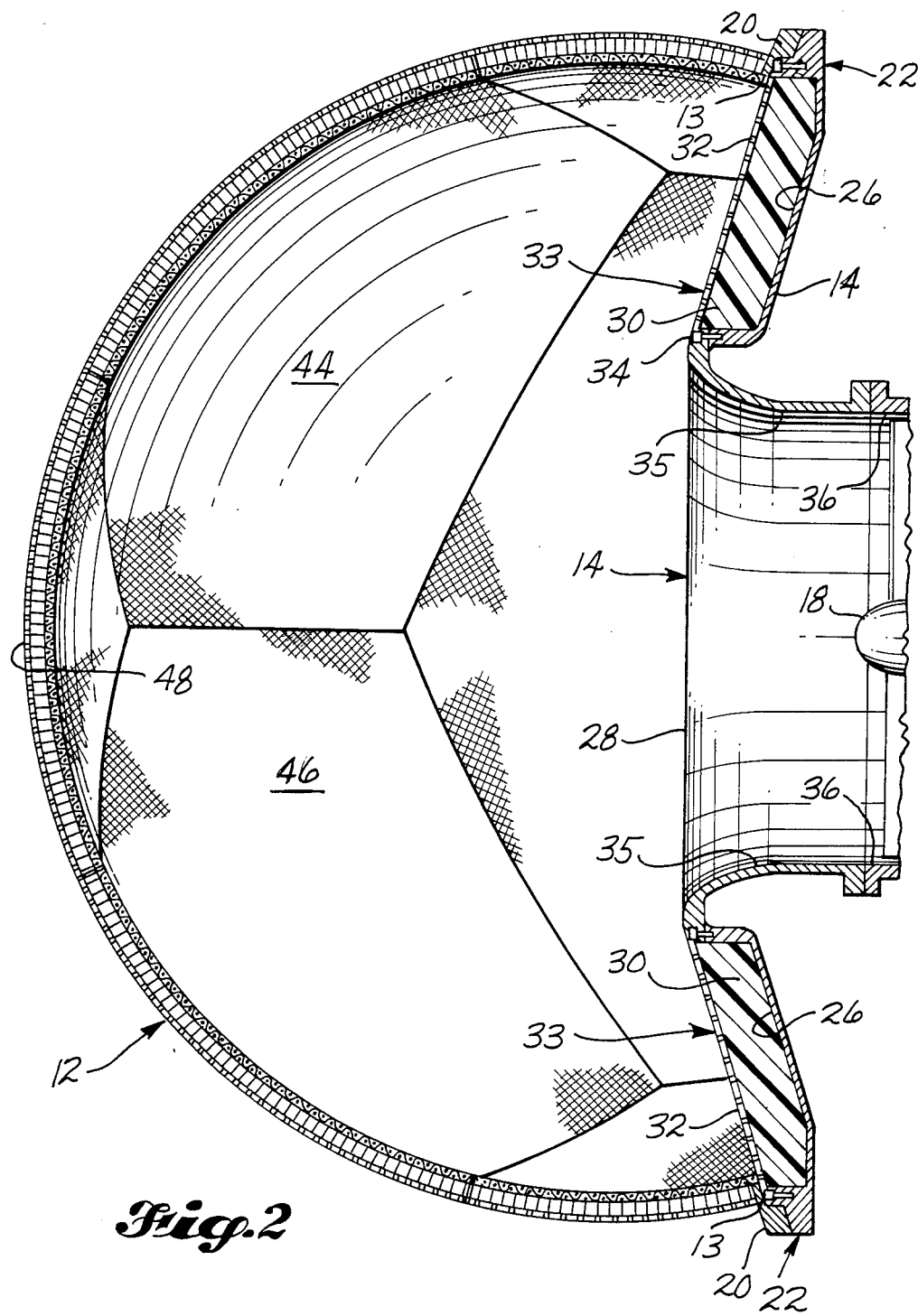
FIG. 2 is a side cross-sectional view of the IDC shown in FIG. 1, wherein the sphere portion is connected to the bellmouth portion.

Referring now to FIG. 2, the sphere 12 is connected to the bellmouth 14 by any suitable means. However, in preferred form, connected to the sphere's circular opening 13 is a circular ring member 20. The ring member 20 is shaped to complementarily mate with the outer radial edge 22 of the bellmouth 14. The sphere 12 may be held in place next to the bellmouth by a plurality of locking members 24, which are connected to the ring member 20 and spaced approximately equidistantly around the ring member.

The bellmouth 14 is cast and milled from an aluminum alloy or any other suitable material. By way of example, fiberglass would also be suitable. The bellmouth 14 has a circular recessed portion 26 connecting the bellmouth's outer radial edge 22 to a high-lite portion 28 that has a throat portion 35. Received within this recessed portion 26 is a layer of sound-absorbing material 30. The sound-absorbing material 30 may be made of fiberglass or another suitable material. Covering the sound-absorbing material 30 is a thin layer of perforated sheet metal 32.

The combined construction of the bellmouth's recessed portion 26, the sound-absorbing material 30 and the sheet metal 32 provides a conically shaped bellmouth surface 33 which projects inwardly into the sphere 12. This surface 33 is substantially continuous from the inside of the sphere's circular opening 13 to the edge 34 of the high-lite and throat portion 28, 35 and helps to minimize the acoustic distortions due to the ICD.

The high-lite and throat portion 28, 35 is mated to the engine's intake 36 and provides a continuous and smooth intake surface all the way from inside of the sphere to the engine 18. This construction minimizes growth and distortions in the inlet boundary layer.

Referring now to FIG. 3, therein is shown the generally polyhedral construction of the sphere 12. The sphere 12 is made of a plurality of polygonal sections 38, 40, 42, 44, 46, 48, which are pervious to air, and which are joined to each other at their edges by an adhesive substance. Joinder of the sections 38, 40, 42, 44, 46, 48 in this manner provides a sphere sidewall that is substantially smooth and continuous, and thus eliminates edges and corners which could distort the air as it flows through the sidewall and into the bellmouth's high-lite portion 28.

FIGS. 4-6 show the general air-pervious construction of each polygonal section 38, 40, 42, 44, 46, 48. Each section has an inwardly facing sheet of wire screen material 50, an outwardly facing sheet of perforated sheet metal 52, and a layer of honeycomb material 54 disposed or sandwiched intermediate of the inwardly and outwardly facing sheets. Each polygonal section 38, 40, 42, 44, 46, 48 is made by first joining the honeycomb material 54 to the inwardly and outwardly facing sheets 50, 52, and then forming these joined materials into a curved disk, as shown in FIG. 4, whose radius corresponds to the radius of the sphere 12. The disk 56 is chamfered in the manner indicated by dashed lines 58 resulting in the completed polygonal section 60 shown in FIG. 5. The edges 62, 64, 66 (and the two edges not shown) are coated with the above-mentioned adhesive substance (also not shown) so that the polygonal section 60 can be joined with neighboring sections, in the manner shown in FIGS. 1-3, to construct the sphere 12.

The description of the ICD 12 presented above is provided for the purpose of explaining the present invention. The above embodiment is not to be used for the purpose of defining and/or limiting patent protection of the invention in any manner. Rather, patent protection is to be determined solely by the subjoined claims.

What is claimed is:

1. An air inflow control device for simulating flight-like air inflow conditions into the intake of a jet engine or the like, comprising:
   a hollow sphere truncated in a manner defining a circular opening into said sphere, with the sidewall of said sphere being pervious to airflow therethrough; and
   a circular bellmouth closing said opening, said bellmouth including a recessed portion, a sound-absorbing material received in said recessed portion, and a layer of perforated material covering said sound-absorbing material, with said recessed portion, said sound-absorbing material and said perforated material together forming an inwardly projecting surface having a generally conical taper from near the bellmouth's outer radial edge to a central high-lite portion of said bellmouth, said high-lite portion providing an air inlet from inside said sphere to said jet engine, and wherein said high-lite portion is mated to said engine intake in a manner such that said high-lite portion inlet and said engine intake form a smooth and continuous intake from inside said sphere to said engine.

2. The device of claim 1, wherein said sidewall of said sphere comprises an inwardly facing layer of a screen material, an outwardly facing layer of perforated sheet material, and a central layer of honeycomb material disposed intermediate of said inwardly and outwardly facing layers.

3. The device of claim 2, wherein said sidewall of said sphere comprises a plurality of curved polygonal sections, wherein said sections are connected together in a manner so that they form a substantially smooth and continuous spherical sidewall.

4. The device of claim 3, wherein each polygonal section is connected to a neighboring polygonal section by adhesively bonding together adjoining edges of said sections.

5. The device of claim 4, wherein said sound-absorbing material comprises a fiberglass lining received in said recessed portion of said bellmouth.

6. The device of claim 5, including a circular ring member connected to the edge of said circular opening of said sphere, and wherein the outer radial edge of said bellmouth is shaped to mate with said ring member, to connect said bellmouth to said circular opening.

7. The device of claim 1, wherein said sidewall of said sphere comprises a plurality of curved polygonal sections, wherein said sections are connected together in a manner so that they form a substantially smooth and continuous spherical sidewall.

8. The device of claim 7, wherein each polygonal section is connected to a neighboring polygonal section by adhesively bonding together adjoining edges of said sections.

9. The device of claim 1, wherein said sound-absorbing material comprises a fiberglass lining received in said recessed portion of said bellmouth.

10. The device of claim 9, including a circular ring member connected to the edge of said circular opening of said sphere, and wherein the outer radial edge of said bellmouth is shaped to mate with said ring member, to connect said bellmouth to said circular opening.

* * * * *